(12) United States Patent   (10) Patent No.: US 7,386,522 B1
Bigus et al.   (45) Date of Patent: Jun. 10, 2008

(54) OPTIMIZING THE PERFORMANCE OF COMPUTER TASKS USING INTELLIGENT AGENT WITH MULTIPLE PROGRAM MODULES HAVING VARIED DEGREES OF DOMAIN KNOWLEDGE

(75) Inventors: Joseph Phillip Bigus, Rochester, MN (US); Brian John Cragun, Rochester, MN (US); Helen Roxlo Delp, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1826 days.

(21) Appl. No.: 09/100,595

(22) Filed: Jun. 19, 1998

Related U.S. Application Data

(62) Division of application No. 08/822,993, filed on Mar. 21, 1997, now abandoned.

(51) Int. Cl.
*G06N 5/00* (2006.01)

(52) U.S. Cl. .......................... 706/15; 709/202; 706/45; 710/20

(58) Field of Classification Search .................. 706/16, 706/15, 45, 49; 705/40; 709/202; 710/20
See application file for complete search history.

(56) References Cited

U.S. PATENT DOCUMENTS

| | | | |
|---|---|---|---|
| 4,881,263 A | 11/1989 | Herbison et al. | 380/21 |
| 4,914,585 A | 4/1990 | Packard et al. | 364/200 |
| 5,073,890 A | 12/1991 | Danielsen | 370/58.2 |
| 5,093,914 A * | 3/1992 | Colpien et al. | 395/704 |
| 5,117,496 A | 5/1992 | Stearns et al. | 395/700 |
| 5,155,763 A | 10/1992 | Bigus et al. | 379/113 |
| 5,226,176 A | 7/1993 | Westaway et al. | 395/800 |
| 5,235,642 A | 8/1993 | Wobber et al. | 380/25 |
| 5,241,621 A | 8/1993 | Smart | 395/51 |
| 5,276,768 A | 1/1994 | Bander | 395/10 |
| 5,301,320 A | 4/1994 | McAtee et al. | 395/650 |
| 5,317,688 A | 5/1994 | Watson et al. | 395/161 |
| 5,325,528 A | 6/1994 | Klein | 395/650 |
| 5,329,626 A | 7/1994 | Klein et al. | 395/375 |
| 5,355,444 A | 10/1994 | Chirico | 395/51 |
| 5,367,454 A | 11/1994 | Kawamoto et al. | 364/419.2 |

(Continued)

FOREIGN PATENT DOCUMENTS

CA   2061117   2/1992

(Continued)

OTHER PUBLICATIONS

Koza, John R., Genetic Programming, The MIT Press, 1993., Jan. 1993.*

(Continued)

*Primary Examiner*—Wilbert L Starks, Jr.
(74) *Attorney, Agent, or Firm*—Wood, Herron & Evans, LLP

(57) ABSTRACT

The performance of a given task is optimized by utilizing an intelligent agent having a plurality of program modules suited to perform the computer task but having varied degrees of domain knowledge. Based upon an objective criteria that may be determined for a given situation, one or more of the program modules in the intelligent agent may be selected to perform the task, thereby optimizing the performance of the computer task for a wide variety of situations.

45 Claims, 9 Drawing Sheets

U.S. PATENT DOCUMENTS

| | | | |
|---|---|---|---|
| 5,367,635 A | 11/1994 | Bauer et al. | 395/200 |
| 5,371,889 A | 12/1994 | Klein | 395/650 |
| 5,392,345 A | 2/1995 | Otto | 379/265 |
| 5,398,012 A | 3/1995 | Derby et al. | 340/825.03 |
| 5,408,470 A | 4/1995 | Rothrock et al. | 370/62 |
| 5,421,013 A | 5/1995 | Smith | 395/650 |
| 5,423,043 A | 6/1995 | Fitzpatrick et al. | 395/700 |
| 5,455,890 A | 10/1995 | Wang | |
| 5,465,286 A | 11/1995 | Clare et al. | 379/34 |
| 5,465,308 A | 11/1995 | Hutcheson et al. | 382/159 |
| 5,469,562 A | 11/1995 | Saether | 395/182.18 |
| 5,481,699 A | 1/1996 | Saether | 395/182.13 |
| 5,481,715 A | 1/1996 | Hamilton et al. | 395/700 |
| 5,553,145 A | 9/1996 | Micali | |
| 5,603,031 A | 2/1997 | White et al. | 395/683 |
| 5,613,012 A | 3/1997 | Hoffman et al. | |
| 5,644,727 A * | 7/1997 | Atkins | 705/40 |
| 5,646,998 A | 7/1997 | Stambler | 380/25 |
| 5,655,081 A * | 8/1997 | Bonnell et al. | 395/200.32 |
| 5,689,652 A | 11/1997 | Lupien et al. | 395/237 |
| 5,696,828 A | 12/1997 | Koopman, Jr. | 380/46 |
| 5,704,017 A | 12/1997 | Heckerman et al. | |
| 5,715,312 A | 2/1998 | Ijtsma | 380/3 |
| 5,717,989 A | 2/1998 | Tozzoli et al. | 705/37 |
| 5,729,472 A * | 3/1998 | Seiffert et al. | 702/188 |
| 5,761,663 A | 6/1998 | Lagarde et al. | 707/10 |
| 5,765,028 A | 6/1998 | Gladden | 395/11 |
| 5,790,789 A | 8/1998 | Suarez | |
| 5,802,396 A * | 9/1998 | Gray | 710/20 |
| 5,875,437 A * | 2/1999 | Atkins | 705/40 |
| 5,905,495 A | 5/1999 | Tanaka et al. | |
| 5,933,647 A | 8/1999 | Aronberg et al. | |
| 6,021,437 A | 2/2000 | Chen et al. | |
| 6,023,586 A | 2/2000 | Gaisford et al. | |
| 6,049,819 A | 4/2000 | Buckle et al. | |
| 6,061,792 A | 5/2000 | Simon | |
| 6,085,178 A | 7/2000 | Bigus et al. | |
| 6,145,096 A | 11/2000 | Bereiter et al. | |
| 6,147,977 A | 11/2000 | Thro et al. | |
| 6,148,067 A | 11/2000 | Leipow | |
| 6,151,096 A | 11/2000 | Cheng et al. | |
| 6,192,354 B1 | 2/2001 | Bigus et al. | |
| 6,282,701 B1 | 8/2001 | Wygodny et al. | |
| 6,301,612 B1 | 10/2001 | Selitrennikoff et al. | |
| 6,345,264 B1 | 2/2002 | Breese et al. | |
| 6,427,142 B1 * | 7/2002 | Zachary et al. | 706/49 |
| 6,671,818 B1 | 12/2003 | Mikurak | |
| 6,694,314 B1 | 2/2004 | Sullivan et al. | |
| 6,785,834 B2 | 8/2004 | Chefalas et al. | |
| 2003/0084010 A1 | 5/2003 | Bigus et al. | |
| 2004/0059929 A1 | 3/2004 | Rodgers et al. | |

FOREIGN PATENT DOCUMENTS

| | | |
|---|---|---|
| EP | 0519109 A1 | 12/1992 |
| EP | 0589249 A2 | 3/1994 |
| EP | 0598534 A1 | 5/1994 |
| EP | 0611210 A1 | 8/1994 |
| JP | 02-224068 | 6/1990 |
| JP | 3195141 | 8/1991 |
| JP | 4157944 | 5/1992 |
| JP | 4256101 | 9/1992 |
| JP | 04-191977 | 10/1992 |
| JP | 5324009 | 12/1993 |
| JP | 6175944 | 6/1994 |
| WO | WO 93/21586 | 10/1993 |

OTHER PUBLICATIONS

Maes, Pattie, Software Agents, slide 62 of 144; presented in Chicago in 1997; presently displayed at http://pattie.www.media.mit.edu/people/pattie/CHI97/sld062.htm; viewed Sep. 21, 1999 11:05 AM., Jan. 1997.*

Giorgios and Maes, Pattie, MIT Media Lab: Software Agents Group: Projects, Website: http://agents.www.media.mit.edu/groups/agents/projects/, 1997, p. 3 of 5, viewed:Sep. 21, 1999 10:18 AM., Jan. 1997.*

Chavez, A. and Maes, P. , Processings of the First International Conference on the Practical Application of Intelligent Agents and Multi-Agent Technology, Black pool, U.K.: Practical Application Company, Apr. 22-24, 1996, p. 75-90., Apr. 1996.*

Mitchell, Melaine, An Introduction to Genetic Algorithms, The MIT Press, Cambridge, Massachusetts, 1996, pp. 95-100., Jan. 1996.*

Aparicio, M. et al, Agent information contracts within virtual private networks, High-Assurance Systems Engineering Symposium, 1998. Proceedings. Third IEEE International, Nov. 13-14, 1998, pp. 304-311.*

Selker, Ted, "Coach: A Teaching Agent that Learns," Communication of the ACM, vol. 37, No. 7, Jul. 1994, pp. 92-99.

T. Martelli et al., "MEDA: a Multi-Expert Distributed Architecture as a Testbed for Distributed Strategies," Developing and Managing Expert System Programs, 1991, Proceedings of the IEEE/ACM International Conference, pp. 98-105.

J. R. Oliver, "A Machine-Learning Approach to Automated Negotiation and Prospects for Electronic Commerce," Journal of Management Information Systems, Armnok, NY, vol. 13, No. 3, 1996, pp. 83-112, XP000865688.

Hoff, et al., "The Open Software Description Format (OSD)" Aug. 11, 1997 W3C.

Sim et al; Simulation of a Multi-agent Protocol for Task Allocation in Cooperative Design; IEEE International Conference on Systems, Man, and Cybernetics Proceedings; vol. 3,; Oct. 12-15, 1999; pp. 95-100.

Nonogaki et al; FRIEND21 project: a Construction of 21st Century Human Interface; Proceedings of the SIGCHI Conference on Human Factors in Computing Systems: Reaching Through Technology ; Mar. 1991; pp. 407-414.

Kopelman, "Accelerated Engineering, The 3 Secrets to Just-In-Time Product Development (JITPD)," WESCON/94, Idea/Microelectronics, Conference Record; Sep. 27-29, 1994; pp. 362-367.

Stidolph, "Evolutionary Design of Complex Software (EDCS) Demonstration Days 1999," ACM SIGSOFT Engineering Notes; vol. 25, No. 1; Jan. 2000.

Purssell, "The Product Release Interface: Environment and Concerns," Fifth Electronic Manufacturing Technology Symposium International "Design-to-Manufacturing Transfer Cycle," Oct. 10-12, 1998, pp. 51-56.

Manderson, Satellite Systems: How to Distribute Data, Computing, Consulting, and Responsibility All at the Same Time, Proceedings of the 17th Annual ACM SIGUCCS Conference On User Services; Oct. 1989.

Hiroto Kase et al., "A Development of Programming Supporting Environment for the Agent-Based Programming Language—ADIPS/L," Information Processing Society of Japan, pp. (2-337)-(2-338).

Kazuhiro Takeyasu et al., "Agent System," Chuou keizai-sha, pp. 159-161.

Tetsuya Uchiki, "Price Forming Simulation in Electrical Market", Information Processing Society Memoir, vol. 95, No. 105 (95-AI-102), pp. 1-6, Faculty of Business Administration, Toyo University.

D. Johansen et al., "Operating System Support for Mobile Agents," Workshop on Hot Topics in Operating Systems, pp. 42-45, 1995.

A. Mensch et al., "REAKT: Real-time Architecture for Time-critical Knowledge-based Systems," Intelligent Systems Engineering, pp. 143-167, Autumn 1994.

A. Reinhardt, "The Network with Smarts," 4465 Byte, McGraw-Hill, Inc., Peterborough, NH, US, vol. 19, No. 10, pp. 51-64, Oct. 1994.

H. Nawna et al., "An Introduction to Agent Technology," BT Technology Journal, vol. 14, No. 4, pp. 55-67, Oct. 1996.

A. Rasmusson et al., "Personal Security Assistance for Secure Internet Commerce," New Security Paradigm '96 Workshop, On-Line, pp. 1-12, Sep. 16, 1996.

W. Farmer et al., "Security for Mobile Agents: Issues and Requirements," Proceedings of the 19th National Information Systems Security Conference, On-Line, pp. 1-7, 1996.

F. Hohl, "An Approach to Solve the Problem of Malicious Hosts in Mobile Agent Systems," Universitat Stuttgart, Fakultat Informatik, Bericht Nr. 1997/03, On-Line, pp. 1-13, Mar. 1, 1997.

Kahn, David, *The Codebreakers: The Story of Secret Writing*, New York: Scribner, (1996), pp. 224-229.

Bruce Schneier, *Applied Cryptography, Second Edition; Protocols, Algorithms, and Source Code in C*, John Wiley & Sons, Inc. (1996), pp. v-xiv and 1-10.

Tuomas Sandholm et al., "Issues in Automated Negotiation and Electronic Commerce: Extending the Contract Net Framework", First International Conference on Multi-Agent Systems, (Jun. 1995), pp. 328-335.

Database 636 (IAC Newsletter) on Dialog, No. 3263922, "General Magic attempts to pull Glory from Web Hat", Network Briefing, (Jul. 19, 1996), 2 pages.

Database 148 (IAC Trade & Industry Database), No. 4056305, Katy Ring. "Neural Networks, knowledge systems, genetic algorithms at Cambridge Consultants", Computergram International, (Jul. 17, 1989), 3 pages.

Gregory E. Kersten et al., "Negotiation in Distributed Artificial Intelligence: Drawing from Human Experience", *Proceedings of the Twenty-Seventh Annual Hawaii International Conference on System Sciences*, (1994), pp. 258-270.

Jim R. Oliver, "On Artificial Agents for Negotiation in Electronic Commerce", *Proceedings of the 29th Annual Hawaii International Conference on System Sciences*, (1996), pp. 337-346.

Edward A. Billard, "Effects of Group Size on Goal-Directed Agents in Distributed Environments", IEEE Publication No. 0-7803-2559-1/95, (1995), pp. 3403-3408.

Gilbert et al., "IBM Intelligent Agents", http://www.networking.ibm.com/iag/iagwp1.html, (1996).

"Commercial Expert System Shells", http://www.ioe.ac.uk/hgm/expert3.html, (1997).

"Commercial Software Packages for Neural Network Simulation", ftp://ftp.sas.com/pub/neural/FAQ6.html, (1997).

A.D. Kwok et al., "A Development System for Intelligent Agent Manufacturing Software", *Integrated Manufacturing Systems*, 1994, vol. 5 No. 4/5, pp. 64-76.

Barbara Hayes-Roth, "An architecture for adaptive intelligent systems", *Artificial Intelligence*, Jan. 1995, vol. 72, No. 1-2, pp. 329-365.

Siegfried R. Bocionek, "Agent systems that negotiate and learn", *International Journal of Human-Computer Studies*, Mar. 1995, vol. 42, No. 3, pp. 265-268.

Glenn R. Stearns, "Agents and the HP NewWave Application Program Interface", *Hewlett-Packard Journal*, Aug. 1989, pp. 32-37.

T.J. Grant, "A review of Multi-Agent Systems techniques, with application to Columns User Support Organization", *Future Generation Computer Systems*, May 1992, vol. 7, No. 4, pp. 413-437.

Mufit Ozden, "Intelligent Objects in Simulation", *ORSA Journal on Computing*, Fall 1994, vol. 6, No. 4, pp. 329-341.

Peter Gibbons et al., "Intelligent Agents in Multi-Media Systems", *Sharp Technical Journal*, Dec. 1994, vol. 60, pp. 11-14.

Cristano Castelfranchi, "Guarantees for Autonomy in Cognitive Agent Architecture", *Proceedings of ECAI-94 Workshop on Agent Theories, Architectures, and Languages*, Amsterdam, The Netherlands, Aug. 8-9, 1994, pp. 56-70.

Devindra Weerasooriya et al., "Design of a Concurrent Agent-Oriented Language", *Proceedings of ECAI-94 Workshop on Agent Theories, Architectures, and Languages*, Amsterdam, The Netherlands, Aug. 8-9, 1994, pp. 386-401.

Agostino Poggi, "DAISY; an Object-Oriented System for Distributed Artificial Intelligence", *Proceedings of ECAI-94 Workshop on Agent Theories, Architectures, and Languages*, Amsterdam, The Netherlands, Aug. 8-9, 1994, pp. 341-354.

David Kinny et al., "Planned Team Activity", *4th European Workshop on Modelling Autonomous Agents in a Multi-Agent World*, MAAMAW '92, S. Martino al Cimino, Italy, Jul. 29-31, 1992, pp. 227-256.

Stephen Marsh, "Trust in Distributed Artificial Intelligence", *4th European Workshop on Modelling Autonomous Agents in a Multi-Agent World*, MAAMAW '92, S. Martino al Cimino, Italy, Jul. 29-31, 1992, pp. 94-112.

Beerud Sheth et al., "Evolving Agents For Personalized Information Filtering", *Proceedings of the Ninth Conference on Artificial Intelligence for Applications*, Orlando, Florida, Mar. 1-5, 1993, pp. 345-352.

Tremaine A.O. Cornish et al., "What Has Mill to Say about Data Mining", *Proceedings of The 11th Conference on Artificial Intelligence for Applications*, Los Angeles, California, Feb. 20-23, 1995, pp. 347-353.

Siegfried Bocionek, "Software Secretaries: Learning and Negotiating Personal Assistants for the Daily Office Work", *Proceedings of IEEE Int'l, Conf. on Systems, Man and Cybernetics*, San Antonio, Texas, Oct. 2-5, 1994, vol. 1, pp. 7-12.

Enrique D. Espinosa, "Intelligent Classroom Information Agent Multimedia Lab & Visual Guides for Datastructures II", *Proceedings of the Int'l. Conf. on Multimedia Computing and Systems*, Washington, D.C., May 15-18, 1995, pp. 302-305.

Rolf Pfeifer et al., "Distributed Adaptive Control: A Paradigm for Designing Autonomous Agents", Toward a Practice of Autonomous Systems, *Proceedings of the First European Conf. on Artificial Life*, Paris, France, Dec. 1991, pp. 21-30.

Alison Cawsey et al., "A Comparison of Architectures for Autonomous Mutli-Agent Communication", *Proceedings of the 10th European Conference on Artificial Intelligence*, Vienna, Austria, Aug. 3-7, 1992, pp. 249-251.

Paul Kearney et al., "Emergent Behaviour in a Multi-Agent Economic Situation", *Proceedings of the 11th European Conference on Artificial Intelligence*, Amsterdam, The Netherlands, Aug. 8-12, 1994, pp. 284-288.

Wayne Wobcke, Reasoning about Action from the Perspective of Situation Semanitcs, *Proceedings of the 6th Australian Joint Conference on Artificial Intelligence*, Melbourne, Australia, Nov. 16-19, 1993, pp. 71-76.

Gunila A. Sundstrom et al., "Cooperative Human-Computer Decision Making: An Experiment and Some Design Implications", *Proceedings of the Human Factors and Ergonomics Society 38th Annual Meeting*, Nashville, Tennessee, Oct. 24-28, 1994, pp. 220-224.

T. Moody, "AT&T Personalink (SM)—A Public Network for Smart Agent Pics", *IEE Colloquium on Roaming with Data*, London, UK, Mar. 6, 1995, Digest No. 1995/046.

Lech Polkowski et al., "Introducting Rough Mereological Controllers: Rough Quality Control", *Proceedings of RSSC '94 3rd Int'l Workshop on Rough Sets and Soft Computing*, San Jose, California, Nov. 10-12, 1994.

Terence J. Parr et al., "A Language for Creating and Manipulating VRML", *Symposium on the VRML '95*, San Jose, California, Dec. 14-15, 1995, pp. 123-131.

Joseph P. Bigus, *Data Mining with Neural Networks*, McGraw-Hill Publishing Company, 1996.

David M. Chess, "Security Considerations in Agent-Based Systems", *For the 1st Annual Conference on Emerging Technologies and Applications in Communications*, Portland, Oregon, May 7-10, 1996.

U.S. Appl. No. 08/821,935, filed Mar. 21, 1997, Intelligent Agent With Negotiation Capability and Method of Negotiation Therewith.

U.S. Appl. No. 08/822,119, filed Mar. 21, 1997, Apparatus and Method for Communicating Between an Intelligent Agent and Client Computer Process Using Disguised Messages.

U.S. Appl. No. 08/826,107, filed Mar. 21, 1997, Apparatus and Method for Optimizing the Performance of Computer Tasks Using Multiple Intelligent Agents Having Varied Degrees of Domain Knowledge.

* cited by examiner

OPTIMIZING THE PERFORMANCE OF COMPUTER TASKS USING INTELLIGENT AGENT WITH MULTIPLE PROGRAM MODULES HAVING VARIED DEGREES OF DOMAIN KNOWLEDGE

CROSS-REFERENCE TO RELATED APPLICATIONS

This application is a divisional application of U.S. Ser. No. 08/822,993, filed on Mar. 21, 1997 by Bigus et al., entitled "APPARATUS AND METHOD FOR OPTIMIZING THE PERFORMANCE OF COMPUTER TASKS USING INTELLIGENT AGENT WITH MULTIPLE PROGRAM MODULES HAVING VARIED DEGREES OF DOMAIN KNOWLEDGE", which application is incorporated by reference herein.

This application is related to the following U.S. patent applications, all of which were filed on Mar. 21, 1997 by Bigus et al: U.S. Ser. No. 08/821,935 entitled "INTELLIGENT AGENT WITH NEGOTIATION CAPABILITY AND METHOD OF NEGOTIATION THEREWITH", U.S. Ser. No. 08/822,119 entitled "APPARATUS AND METHOD FOR COMMUNICATING BETWEEN AN INTELLIGENT AGENT AND CLIENT COMPUTER PROCESS USING DISGUISED MESSAGES" and U.S. Ser. No. 08/826,107 entitled "APPARATUS AND METHOD FOR OPTIMIZING THE PERFORMANCE OF COMPUTER TASKS USING MULTIPLE INTELLIGENT AGENTS HAVING VARIED DEGREES OF DOMAIN KNOWLEDGE". The disclosures of all of these applications are hereby incorporated by reference herein.

FIELD OF THE INVENTION

The invention is generally related to intelligent agent computer programs executable on computer systems and the like, and in particular, the use of such agents for performing specific tasks in a computer system.

BACKGROUND OF THE INVENTION

Since the advent of the first electronic computers in the 1940's, computers have continued to handle a greater variety of increasingly complex tasks. Advances in semiconductors and other hardware components have evolved to the point that current low-end desktop computers can now handle tasks that once required roomfuls of computers.

Computer programs, which are essentially the sets of instructions that control the operation of a computer to perform tasks, have also grown increasingly complex and powerful. While early computer programs were limited to performing only basic mathematical calculations, current computer programs handle complex tasks such as voice and image recognition, predictive analysis and forecasting, multimedia presentation, and other tasks that are too numerous to mention.

However, one common characteristic of many computer programs is that the programs are typically limited to performing tasks in response to specific commands issued by an operator or user. A user therefore must often know the specific controls, commands, etc. required to perform specific tasks. As computer programs become more complex and feature rich, users are called upon to learn and understand more and more about the programs to take advantage of the improved functionality.

In addition to being more powerful, computers have also become more interconnected through private networks such as local area networks and wide area networks, and through public networks such as the Internet. This enables computers and their users to interact and share information with one another on a global scale. However, the amount of information is increasing at an exponential rate, which makes it increasingly difficult for users to find specific information.

As a result of the dramatic increases in the both complexity of computer programs and the amount of information available to users, substantial interest has developed in the area of intelligent agent computer programs, also referred to as intelligent agents or simply agents, that operate much like software-implemented "assistants" to automate and simplify certain tasks in a way that hides their complexity from the user. With agents, a user may be able to perform tasks without having to know specific sequences of commands. Similarly, a user may be able to obtain information without having to know exactly how or where to search for the information.

Intelligent agents are characterized by the concept of delegation, where a user, or client, entrusts the agents to handle tasks with at least a certain degree of autonomy. Intelligent agents operate with varying degrees of constraints depending upon the amount of autonomy that is delegated to them by the user.

Intelligent agents may also have differing capabilities in terms of intelligence, mobility, agency, and user interface. Intelligence is generally the amount of reasoning and decision making that an agent possesses. This intelligence can be as simple as following a predefined set of rules, or as complex as learning and adapting based upon a user's objectives and the agent's available resources. An intelligent agent's intelligence or skill as applied to a specific field or function is referred to as domain knowledge.

Mobility is the ability to be passed through a network and execute on different computer systems. That is, some agents may be designed to stay on one computer system and may never be passed to different machines, while other agents may be mobile in the sense that they are designed to be passed from computer to computer while performing tasks at different stops along the way. User interface defines how an agent interacts with a user, if at all.

Agents have a number of uses in a wide variety of applications, including systems and network management, mobile access and management, information access and management, collaboration, messaging, workflow and administrative management, and adaptive user interfaces. Another important use for agents is in electronic commerce, where an agent may be configured to seek out other parties such as other users, computer systems and agents, conduct negotiations on behalf of their client, and enter into commercial transactions.

The relative performance of intelligent agents in handling certain tasks may vary between agents, e.g., depending upon the degree of domain knowledge possessed thereby. However, an agent which performs well when handling a particular task in one instance may not perform as well when handling other tasks, or even when handling the same type of task in other situations and under other circumstances. As a typical agent may experience a wide variety of situations when it is operating in a real world environment, a given agent will not always be able to provide its client with optimal performance. Moreover, it is often difficult, if not impossible, to develop an agent that is capable of handling all possible situations with equally proficient results.

For example, in electronic commerce applications, security is a major concern. Intelligent agents may be entrusted with the authority to sell or purchase products on behalf of a client, and may be dispatched to any number of computer systems in a network to perform negotiations. Often, the computer systems to which the agents are dispatched are remote to the client's system, and thus not under the direct control of the client. An agent may thus be subject to scrutiny by third parties, either through monitoring transmissions between the agent and its client, or through actual scanning and reverse compiling of the program code of the agent. In some instances, the risk may be segregated into transmission risk, which is associated with the transmission media between the agent and the client, and environment risk, which is associated with the environment in which the agent is resident. Each type of risk may present unique concerns for a given agent.

Beyond the clear risk of discovering confidential information such as a client's credit card or bank account number, additional risks are posed when an agent is subject to scrutiny. As an example, an agent would be placed at a competitive disadvantage if any of its negotiation strategies, techniques or plans, or any specific instructions from its client, were discovered by other parties. If a message to an agent from its client indicates that the agent should offer $100, but is authorized to go as low as $90, another party that intercepts this message immediately knows that a transaction may be completed at the lower price. Also, even if the message is not intercepted, if the agent has stored the $90 price as its lowest authorized offer, reverse compilation or scanning of the agent by another party may lead to similar results.

The degree of domain knowledge such as autonomy granted to an agent by its client, and the remaining domain knowledge retained by the client, may vary significantly for different agents. In general, however, the more domain knowledge that is imparted to an agent, the greater the security risk presented to the agent and its client.

Often, a tradeoff must be made between absolutely secure agent transactions with prohibitively high costs, and less secure agent transactions with acceptable costs. The greatest security would be obtained when most, if not all, of the domain knowledge for conducting negotiations is retained by the client, with only a limited intermediary agent sent out to relay messages between the client and the other party being negotiated with. However, this configuration would present significant time and cost burdens on the client since all decision making would remain with the client, and since multiple messages would likely need to be transmitted between the client and the other party. Given these likely burdens, there would be little, if any, benefit in utilizing an agent at all. This would especially be the case in operating environments where the security risks are known to be small.

Security risks are also present for other applications of intelligent agents. For example, a client may have developed an agent with a unique search engine that greatly outperforms its competitors' designs. In certain operating environments, the agent may be more likely to be intercepted and copied by competitors—a situation that the client would prefer to avoid. However, without an agent mechanism that appropriately balances cost and security, the industry will continue to be limited by today's solutions.

SUMMARY OF THE INVENTION

The invention addresses these and other problems associated with the prior art in providing a manner of optimizing the performance of a given computer task with an intelligent agent by utilizing one or more of a plurality of program modules suited to perform the computer task but having varied degrees of domain knowledge. Based upon an objective criteria that is determined for a given situation, an intelligent agent is configured to execute one or more of the program modules to perform the task. Consequently, the performance of the computer task by the intelligent agent is optimized for a wide variety of situations.

In an exemplary embodiment of the invention, program modules having varied levels of autonomy are used to conduct negotiations, with the projected security risk for a given negotiation being used as the objective criteria by which program modules are selected to conduct the negotiations. In unknown or untested environments, or in environments in which known security risks are present, a program module which merely acts as an intermediary between the client and another party is selected, leaving the majority of domain knowledge such as authority to complete transactions with the client. For other environments where the security risk is known to be not as great, program modules having more autonomy to conduct negotiations and complete transactions independent of the client are selected, thereby relieving the client of much of the burden of handling these particular negotiations. However, it should be appreciated that a vast number of objective criteria for selecting different agents may be used in the alternative, and thus the invention is not limited to this particular embodiment or application.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described illustrated embodiments of the invention.

DETAILED DESCRIPTION OF THE ILLUSTRATED EMBODIMENTS

Figure 1:
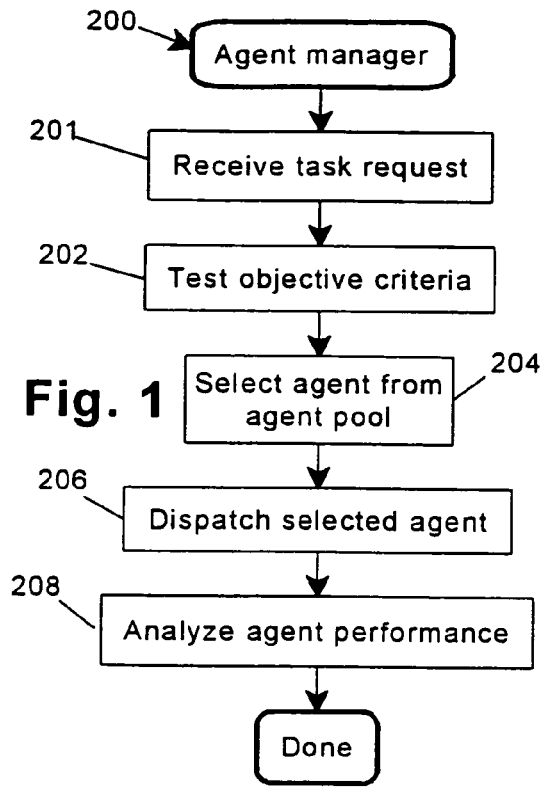
FIG. 1 is a flowchart illustrating the operation of an agent manager in selecting one of a plurality of intelligent agents with varied degrees of domain knowledge to perform a computer task, consistent with the invention.

The embodiments of the invention are principally directed to optimizing the performance of computer tasks by intelligent agents in a wide variety of situations.

Intelligent agents are computer programs which have been delegated a degree of autonomy but which are limited to operating within constraints defined by their client (which may be, for example, another agent; a computer program, application or system; or an individual interacting with the agent through a computer—hereinafter a client computer process). A subset of such agents which are capable of being passed between and operating in different applications or computer systems are referred to as mobile agents. In certain circumstances, the functions of a mobile agent, combined with the functions of an agent manager program that is resident in a client's computer system and interacts with the mobile agent, may cooperatively be considered as portions of a single intelligent agent where the domain knowledge has been allocated between home and mobile portions. However, as used herein, the term agent may be considered to include simply a portion or module of an agent resident in a computer system irrespective of whether any portion of the functionality for the agent as a whole is resident on another computer system or in another computer process.

In general, an agent has the ability to sense, recognize and act. These functions are typically embodied in a number of components, including an engine, a knowledge component, an adapters component, a library, and a view component. Generally, the engine controls the overall operation of an agent and functions as the "brains" of the agent, and the knowledge component stores information that is representative of the acquired knowledge of the agent. The adapters component handles interaction between an agent and external objects, thereby functioning as the mechanism through which the agent "senses" and interacts with its environment. A library persistently stores the information utilized by the knowledge component, and the view component provides the human interface, if any, for an agent, e.g., for supplying instructions to the agent.

Moreover, as discussed above, agents may have varied degrees of domain knowledge—that is, intelligence and/or skills applied to a specific field or function, typically applied to a particular computer task. This may be exhibited through greater or lesser degrees of autonomy or authority, alternate processing strategies, different types and/or amounts of stored information, different sources of information, different capabilities (e.g., monitoring functionality vs. monitoring and response functionality), different goals or objective functions, different inputs or sensed values to which an agent may be responsive, alternate logic implementations (e.g., neural networks vs. procedural logic), etc.

For example, in the illustrated embodiments discussed in greater detail below, domain knowledge is represented in part by the degree of autonomy granted to an agent to conduct negotiations in electronic commerce applications as well as the inputs to which the agent is responsive and the knowledge present in the agent. In addition, in other electronic commerce applications, domain knowledge may represent different manners or strategies for achieving a desired goal, e.g., optimizing a negotiation strategy for one agent to maximize profit, while optimizing a strategy for another agent to maximize the number of completed transactions. Domain knowledge in such applications may also be market dependent, e.g., where agents are optimized for automobile markets, stock markets, etc.

As another example, domain knowledge may represent a particular indexing or searching algorithm used by a data mining agent, e.g., where one particular searching algorithm may work better for legal cases while another may work better for technical documents. In other data mining applications, domain knowledge for one type of agent may include only the ability to monitor for problems, e.g., looking for low stock or late deliveries in an inventory monitoring agent. In other agents, the domain knowledge may also include the ability to respond, e.g., in the above inventory application, ordering low stock items, ordering alternates for late deliveries, or canceling orders when sales are low.

Domain knowledge may also simply represent different manners of performing the same or similar general task, e.g., for the purpose of disguising the identity of the agents' client, since differently-configured agents may present different characteristics when scanned by third parties. For example, this may permit differently-configured agents to be dispatched from a single client to conduct negotiations with a single party so that the agents play off one another to obtain more favorable results for the client.

Intelligent agents are typically programmed to handle particular computer tasks, which may include practically any operation performed on a computer. For example, in electronic commerce applications, the computer tasks for which agents are programmed to handle are typically that of conducting negotiations and completing transactions. For data mining applications, the computer tasks may be the indexing or retrieval of desired information from one or more databases.

Consistent with the invention, one or more objective criteria are used in the selection of one of a plurality of agents, or alternatively, one of a plurality of program modules in an agent, such that a given computer task is handled with optimal performance for its given situation. The plurality of agents (or program modules) are all configured to handle a common general computer task (e.g., "buy a car", "get me everything you can find out about company X", etc.), although the relative performance, capabilities, manners, and mechanisms by which the different agents (or program modules) operate to handle the task may nonetheless differ.

A program module (or mechanism) may be considered to include any function, object, or block of program code configured to perform a given computer task. A suitable objective criteria may represent practically any testable or measurable variable or variables that varies in different situations to which an agent may be exposed, and that may affect an agent's relative performance under those situations.

For example, in the illustrated embodiments discussed in greater detail below, the objective criteria is the perceived risk to an agent dispatched to a remote computer system, whether due to known risks or due to a lack of knowledge as to the risk inherent in an untested environment. The objective criteria may also include relative compute or transmission speeds, or the perceived risk of a particular transmission media, which may be used to determine whether domain knowledge related to disguising or encrypting messages is implemented in a dispatched agent.

Other examples of objective criteria may include the source of information for data mining applications (e.g., particular domains or databases, or types of data), user approval or feedback (e.g., a qualitative assessment of performance by a user), and profits or costs for electronic commerce applications, among others.

Selection of agents or program modules within agents based upon the objective criteria will vary depending upon the particular objective criteria and types of situations to which the agent(s) may be exposed. For example, for the illustrated embodiments discussed in greater detail below, the risk to an agent may be tested based upon the IP address of the remote system to which an agent is to be dispatched, and any identifying information about the other party to a negotiation, among others. Separate risk factors may also be monitored for the transmission media and the agent's resident environment such that domain knowledge specific to each type of risk may be separately utilized as necessary.

For data mining applications, the source of information could be tested based upon the IP address of the database being searched, the type of information being sought, etc. In electronic commerce and other applications, the reliability of data could also be tested by looking at the source thereof (e.g., prices retrieved from a bulletin board may be more reliable than prices quoted in a magazine article), and/or by comparing the similarity of the data to the type of information being sought. Also, the volatility of a market or the type, quantity or value of particular classes of goods may be tested (e.g., a car buying agent may warrant or require a more aggressive negotiation strategy than a compact disc buying agent).

In addition, selection based upon an objective criteria may occur dynamically, and may even be updated from time to time. For example, an agent may be configured to dynamically select program modules in response to changing circumstances such as changes in market conditions, changes in size, speed, or other capacity of a remote site, and new input from a client (e.g., as related to information that is otherwise unavailable to an agent while resident in a remote system), among others.

Agents or program modules may be matched with particular values of an objective criteria to assist in the selection of agents or program modules. The matching may be as simple as a mapping or table matching agents/program modules and values of the objective criteria, or may include predictive and interpretive logic such as provided by factor weighting, neural networks, expert systems, fuzzy logic systems, etc. to attempt to select the most appropriate agent/program module even when no direct match exists for a given value of the objective criteria.

Moreover, selection based upon the objective criteria may be adaptively controlled. For example, the actual results and relative performance of agents dispatched to perform particular tasks may be analyzed and used to modify the selection of agents for given values of the objective criteria. To this extent, a reinforcement learning module, implemented for example in a neural network, may be particularly well suited for use in agent or program module selection consistent with the invention.

As discussed above, the objective criteria may be used to select between a plurality of agents, or between a plurality of program modules in an agent, that have varied degrees of domain knowledge. The program flow for dispatching one of a plurality of agents based upon an objective criteria is illustrated by agent manager 200 in FIG. 1. In block 201, a request to perform a task is received, and in block 202 the objective criteria is tested by the agent manager. Next, in block 204, an agent is selected, based upon the objective criteria, from a pool of agents having varied degrees of domain knowledge. In block 206, the selected agent is dispatched to perform its task, and in block 208, the performance of the agent upon completion of the task is optionally analyzed if adaptive agent selection is utilized.

Figure 2:
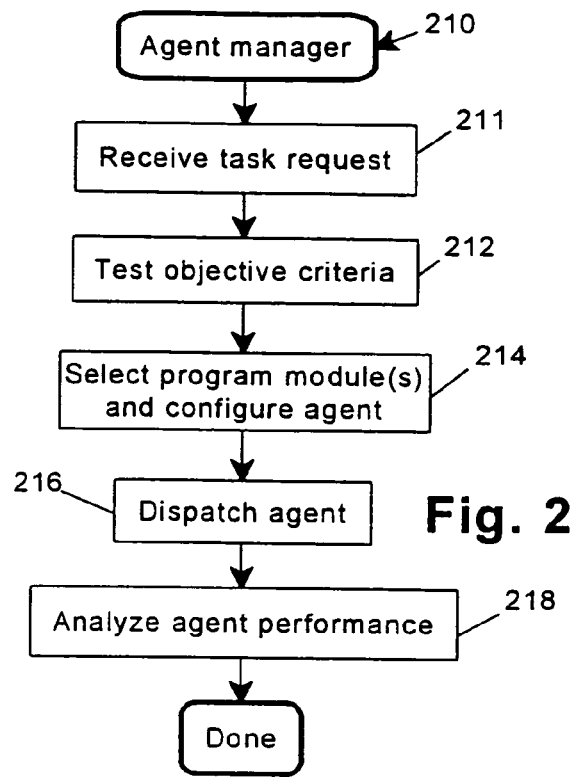
FIG. 2 is a flowchart illustrating the operation of an agent manager in selecting within an intelligent agent one or more of a plurality of program modules with varied degrees of domain knowledge to perform a computer task, consistent with the invention.

Similarly, the program flow for selecting one or more of a plurality of program modules based upon an objective criteria is illustrated by agent manager 210 in FIG. 2. In block 211, a request to perform a task is received, and in block 212 the objective criteria is tested by the agent manager.

Next, in block 214, one or more program modules are selected, based upon the objective criteria, from a plurality of program modules having varied degrees of domain knowledge. In some embodiments, one of a plurality of available program modules may be selected. For example, program modules may have duplicate functionality that is implemented in alternate manners. In such instances, only one module may be selected.

In other embodiments, individual program modules may have additive or non-overlapping functionality so that multiple program modules (e.g., a subset of program modules) are selected in a given agent. For example, one program module may provide basic domain knowledge, with additional program modules selected as necessary to add additional domain knowledge to more sophisticated agents.

In addition, the agent may need to be configured for proper execution of the appropriate program module or modules. For example, if an agent is provided with both selected and non-selected program modules (e.g., where duplicative functionality is provided by different alternative modules), an agent may be configured by initializing, sending a message or setting a variable in the agent specifying which program module or modules to execute. In the alternative, an agent may be constructed from component parts prior to its dispatch, whereby the agent may be configured by bundling all of the selected program modules with any necessary components that are generic to all of an agents' permutations.

Next, in block 216, the configured agent is dispatched to perform its task, and in block 218, the performance of the agent upon completion of the task is optionally analyzed if adaptive selection is utilized.

It should also be appreciated that the functions of testing the objective criteria, selecting agents or agent program modules based upon the objective criteria, and/or analyzing the performance of agents need not be performed by an agent manager or other computer process resident in the client computer system, but may be performed by any suitable evaluation module or program. In addition, performance analyzation may also rely on a user's subjective assessment. A separate agent may be utilized as an evaluation module to perform any or all of these functions. Also, any of these functions may be implemented in the agent that has been dispatched to perform a task, whereby the agent includes an evaluation module.

Figure 3:
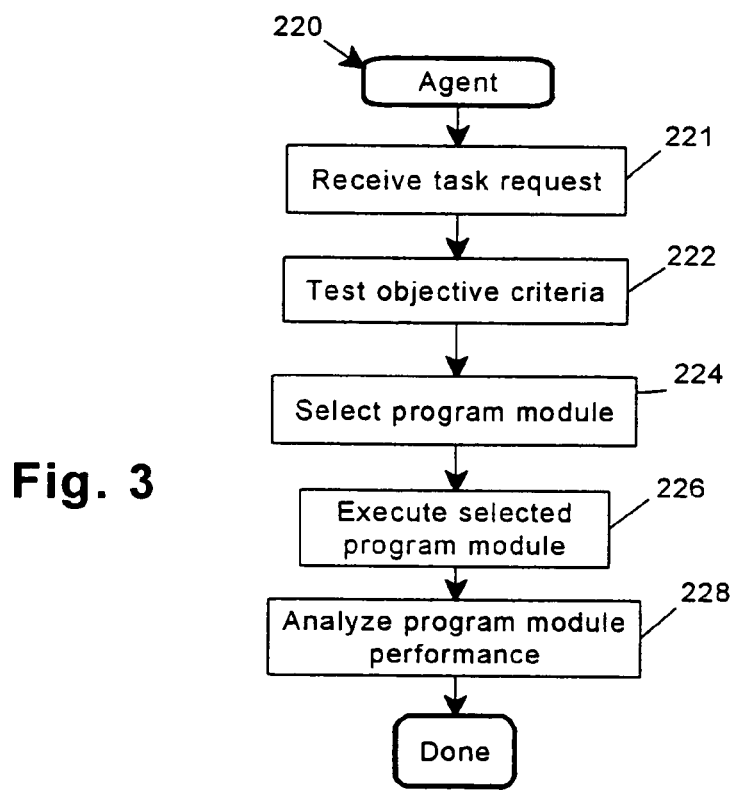
FIG. 3 is a flowchart illustrating the operation of an intelligent agent in selecting one or more of a plurality of program modules therein having varied degrees of domain knowledge to perform a computer task, consistent with the invention.

For example, as illustrated in FIG. 3, an agent 220 may receive a task request in block 221, test the objective criteria in block 222, select the appropriate program module in block 224 and execute the selected program module in block 226 to perform the task. In addition, the agent may analyze its performance in block 228 if desired. The above-described configuration has a number of benefits. For example, in electronic commerce applications, an agent could be dispatched with a task to seek out negotiations on multiple remote systems, whereby the agent would have the ability to dynamically determine the risk at each remote system and alter its behavior accordingly.

Exemplary Hardware/Software Environment

Figure 4:
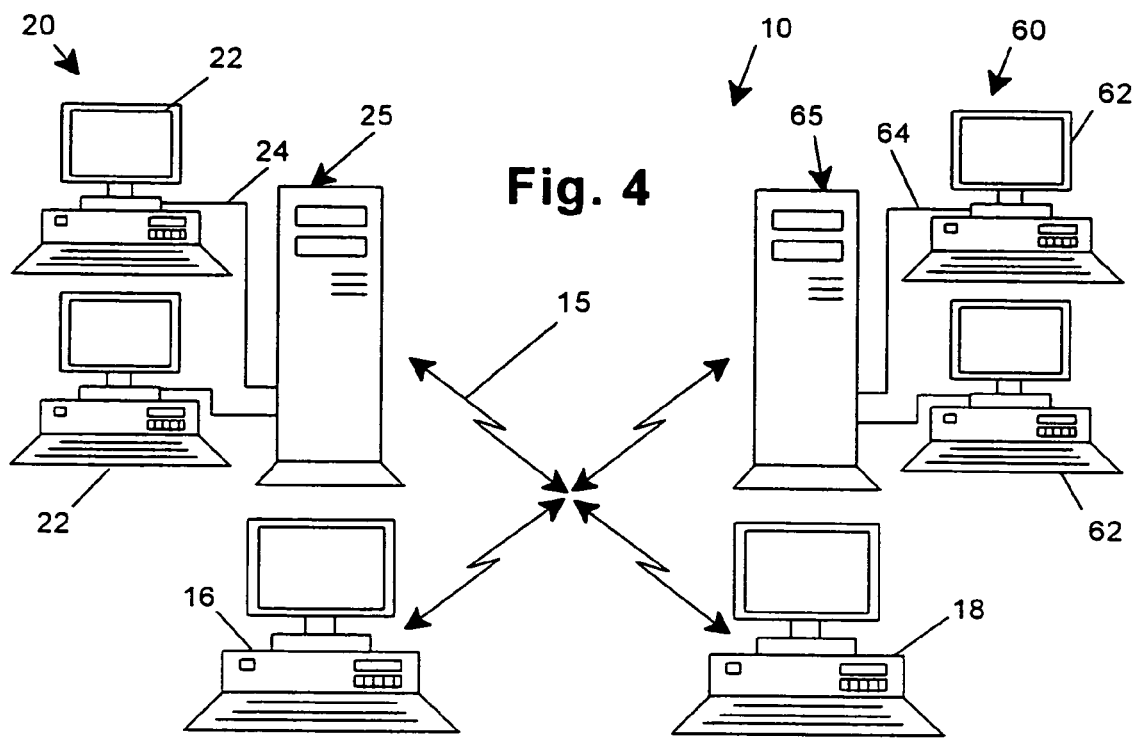
FIG. 4 is a block diagram of a networked computer system environment for use with the illustrated embodiments of the invention.

A representative hardware environment suitable for use with the illustrated embodiments of the invention is illustrated in FIG. 4, where a networked computer system 10 generally includes one or more computer systems, e.g., single-user computer systems 16, 18 and multi-user computer systems 20, 60, coupled through a network 15. Multi-user computer system 20 typically includes one or more servers 25 to which one or more single-user computers 22 may networked through a separate network 24. Similarly, multi-user computer system 20 typically includes one or more servers 65 coupled to one or more single-user computer systems 62 through a network 64. Network 15 may represent any type of networked interconnection, including but not limited to local-area, wide-area, wireless, and public networks (e.g., the Internet).

Figure 5:
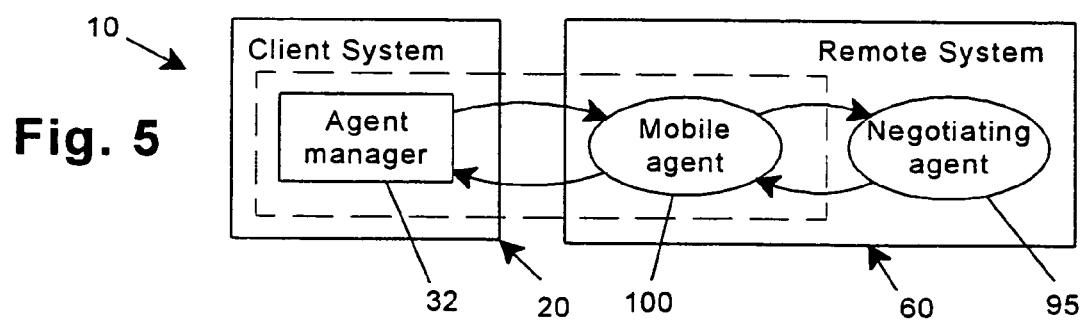
FIG. 5 is a block diagram of the networked computer system of FIG. 4, illustrating the interaction between intelligent agents therein.

It is anticipated that agents consistent with the invention may originate in and be resident from time to time on any of the above-mentioned computer systems. One possible distinction between the computer systems for the purposes of the invention may be whether each is a client or a remote system relative to a particular agent. For example, FIG. 5 illustrates an embodiment of computer system 10 where multi-user computer system 20 is a client system, and multi-user computer system 60 is a remote system.

A client system will hereinafter refer to a computer system that provides an agent a certain level of security from manipulation by other parties when the agent is resident on the system. The client system is also the computer system from which management of the agent is typically handled. The agent typically but not necessarily will also originate from the client system.

A remote system, on the other hand, will hereinafter refer to a computer system that is typically not capable of providing a desired level of security for an agent, generally because the computer system is not under the control of the client. It is typically while resident on a remote system that an agent runs the greatest risk of being scanned or reverse compiled, or of having communications intercepted or monitored, by other parties.

The various embodiments described hereinafter have principal uses in electronic commerce applications, where agents are configured to negotiate commercial transactions, generally in the role of buying or selling agents. The agents may negotiate with other agents, other computer systems, or even other individuals. The agents may interact one-on-one, or may be capable of operating within a "market" of multiple agents, along the lines of a stock or commodity market. Computer systems having the ability to host agents for interaction therebetween include negotiating programs of varying sophistication and are hereinafter referred to as agent hosts. However, it should be appreciated that the invention applies equally to other applications of intelligent agents, and thus should not be limited specifically to electronic commerce applications.

FIG. 5 illustrates a mobile intelligent agent 100 which communicates with an agent manager 32 in client system 20. During negotiation with another party such as negotiating agent 95, mobile agent 100 is resident on remote system 60. It should be appreciated that remote system 60 may be the client for agent 95, or may also be considered to be remote relative to this agent as well.

Figure 6:
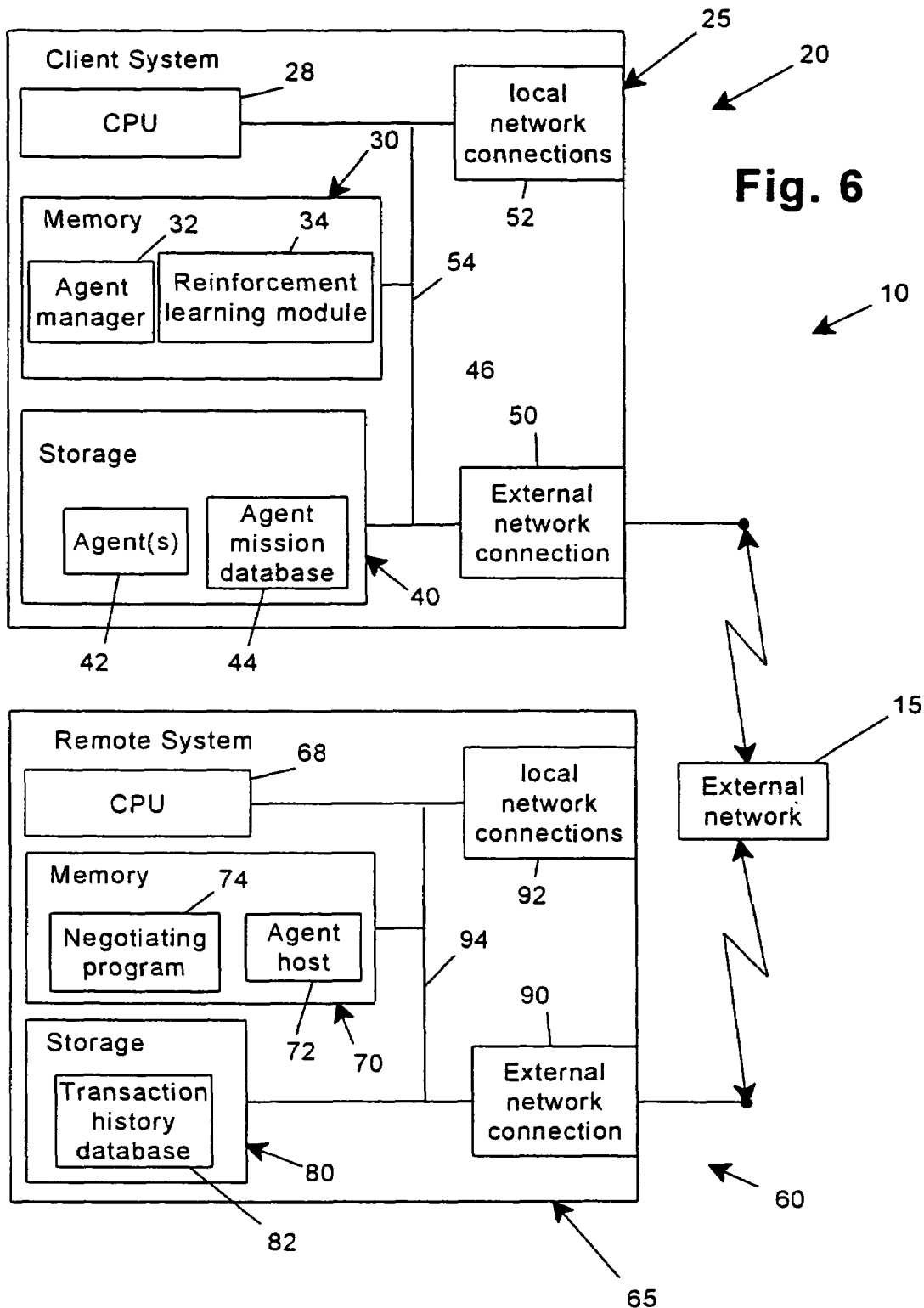
FIG. 6 is another block diagram of the networked computer system of FIG. 4, illustrating in greater detail the primary components in the client and remote computer systems.

An exemplary functional design of networked computer system 10 for implementing various embodiments of the invention is illustrated in FIG. 6. Server 25 of client system 20 generally includes a central processing unit (CPU) 28 coupled to a memory 30 and storage 40 over a bus 54. A local area network interface is provided at 52, and an interface to remote system 60 over external network 15 is provided through interface 50. Agent manager program 32 is resident in memory 30, as is a reinforcement learning module 34 that enables the agent manager to adaptively optimize the performance of tasks. Storage 40 includes one or more agents 42 (of which may include agent 100, for example), which are computer programs or modules that may be retrieved and used locally within system 20, or dispatched to remote systems to execute and perform tasks on behalf of the client system. Storage 40 also includes an agent mission database 44 which may track agent operations and the relative success or failure thereof.

Server 65 of remote system 60 also includes a CPU 68 coupled to a memory 70, storage 80, external network connection 90 and local network connection 92 over a bus 94. An agent host program 72 is resident in memory 70 to handle interactions between agents resident in the remote system. Typically, the agent host program is an asynchronous message/event driven environment that provides a common platform over which agent computer programs execute and interact, much like an operating system. The agent host is also capable of permitting messages to be sent between agents and their clients. Memory 70 also includes a negotiating program 74 which operates as the "other party" in transactions with agent 100, which may be another agent, a market or bulletin board application, or even an interface program through which an individual interacts with agent 100. Storage 80 maintains a transaction history database 82 which logs the transactions completed on the server.

Servers 25, 65 may be, for example, AS/400 midrange computers from International Business Machines Corporation. However, it should be appreciated that the hardware embodiments described herein are merely exemplary, and that a multitude of other hardware platforms and configurations may be used in the alternative.

Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as floppy disks, hard disk drives, and CD-ROM's, and transmission type media such as digital and analog communications links.

Negotiating Agents with Adaptive Agent Selection

Figure 7:
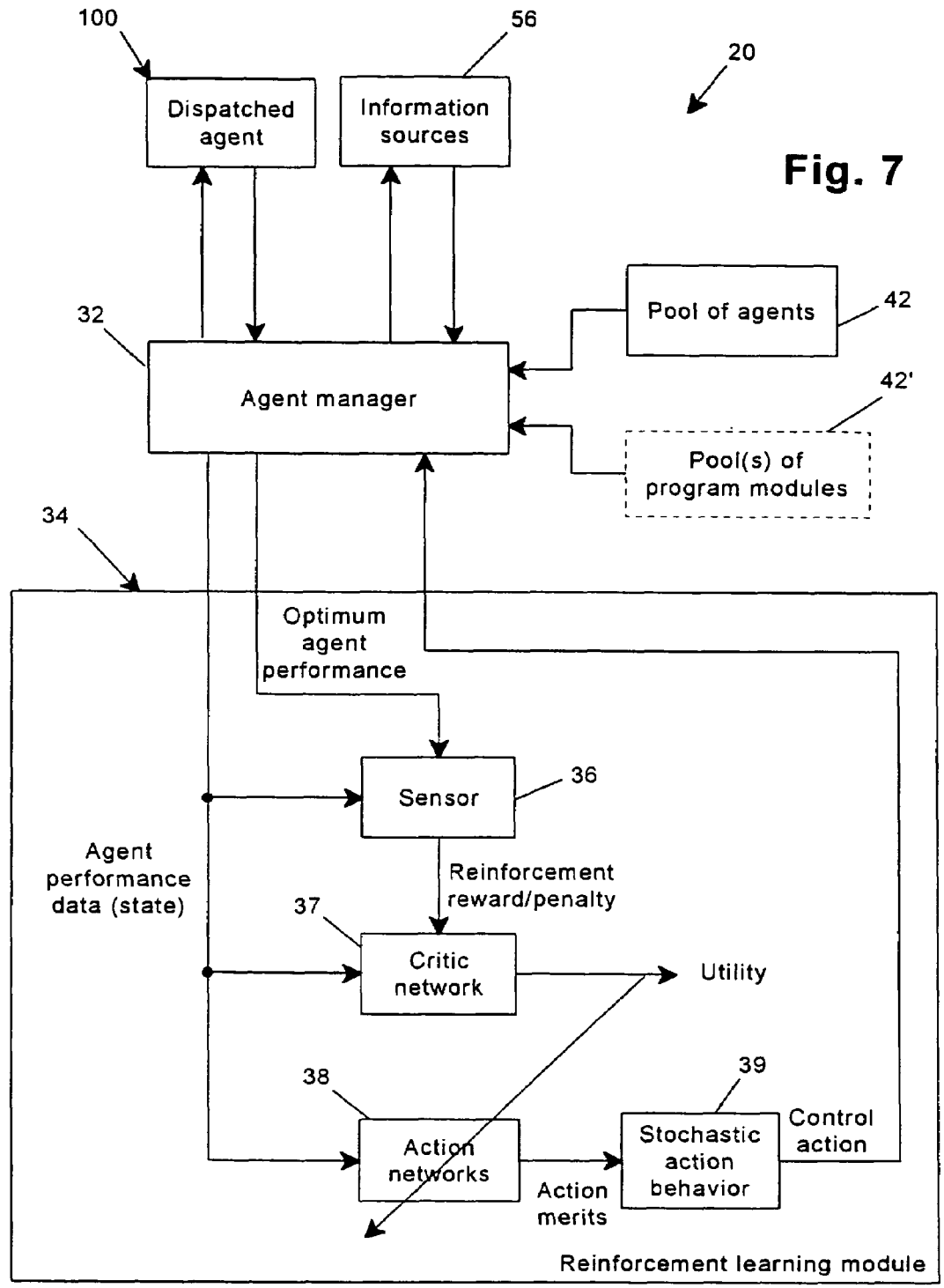
FIG. 7 is a block diagram of an exemplary agent manager and reinforcement learning module consistent with the invention, and for use in the selection of one of a plurality of agents having varied degrees of domain knowledge.

FIG. 7 illustrates an exemplary configuration of client computer system 20 for providing adaptive agent selection consistent with the invention. Agent manager 32 is coupled to a reinforcement learning module 34 through which analysis of agent performance and control of agent selection is performed. Agent manager 32 is shown coupled to a pool of agents 42 having varied degrees of domain knowledge, or alternatively, to one or more pools of program modules 42' having varied degrees of domain knowledge. A dispatched agent 100 communicates with agent manager 32 to conduct negotiations on behalf of the client.

One or more information sources 56 are also coupled to agent manager 32 to enable it to obtain the factor or factors for testing the objective criteria (in this embodiment, security or risk). Information sources 56 may include internal databases updated by manager 32 or other components in client system 20, as well as external databases.

For example, risk may be determined by maintaining a database of one or more risk factors for particular destinations, addresses or parties being negotiated with. To this extent, information about a remote system or other agents may be obtained by the agent manager, such as a name or identification, an operating system, a type of communication port, a client, a bank and/or bank account number, a homebase address, the name or identification of an agent program, the size of an agent program, where messages and other communications with an agent originate, and/or the pattern of input/output (I/O) compared to CPU cycles for I/O transmissions. Also, the agent manager may attempt to retrieve a credit card number or bank account number from an unknown agent and validate the number. Moreover, an unknown agent may be scanned and compared to other known agents, e.g., comparing the percentage of identical code, determining the language the agent was written in, or searching for unique patterns in much the same manner as a virus checking program.

Risk may also be analyzed over time based upon the actual performance of dispatched agents, e.g., by monitoring the number of dispatched agents that disappear, or the length of time between communications from dispatched agents. Also, risk may be analyzed by monitoring dispatched agents for tampering, e.g., by performing checksums or cyclic redundancy checks, analyzing binary signatures, etc. Either the agent manager or the agents themselves may be used to detect any tampering. Risk may also be analyzed by monitoring the behavior of other parties being negotiated with.

In addition, risk may be measured based upon the profitability of agents. For example, the performance of a negotiating agent may be measured in terms of the number of complete transactions, gross income of all transactions, net profit of all transactions, etc. The performance may then be offset by the costs of using the agent, e.g., in terms of the time required to complete transactions, local/remote CPU charges, communication (on-line) charges, etc. If an agent is compromised in some way, where another party gains a negotiating advantage, a negative impact on profitability would be observed.

Agent manager 32 provides inputs to reinforcement learning module 34 to permit module 34 to perform the functions of estimating risk over time and selecting agents or agent program modules. Module 34 maintains a mapping between agents/program modules and different levels or types of risk, so that an appropriate agent/program module is selected depending upon the measured level or type of risk to a dispatched agent under the current circumstances.

Agent manager 32 provides optimum agent performance data related to a desired task for which to test the objective criteria. In response, module 34 outputs a control action output back to agent manager 32 to control which agent or agent program module should be selected and dispatched for performing the given task. Also, when a dispatched agent is returned and analyzed, agent manager 32 provides actual performance data to adaptively modify the selection functionality of module 34.

In the illustrated embodiment, an adaptive heuristic critic neural network architecture is utilized in module 34 to provide adaptive reinforcement learning. The design, training and operation of an adaptive heuristic critic neural network is well known in the art. For example, one suitable development environment for performing the development and training of such a neural network is the IBM Neural Network Utility available from International Business Machines Corporation, among others.

Module 34 includes a sensor 36 which compares desired (optimum) agent performance and actual agent performance and generates a scalar reinforcement reward/penalty value therefrom. A critic network 37 provides temporal difference learning in response to the actual agent performance data and the reinforcement value from the sensor. Critic network 37 outputs a utility signal that is back propagated to a plurality of action networks 38.

An action network 38 is provided for each agent or program module. Each action network receives agent performance data and outputs therefrom an action merit signal to a stochastic action behavior block 39. Block 39 probabilistically chooses an action (here, which one of the agents or program modules to dispatch), and outputs therefrom a control action signal representative thereof to agent manager 32. Block 39 introduces randomness to agent selection to widen its search space, which has been found to improve long term performance of the module.

Module 34 adaptively modifies its selection of agents based upon the analyzed performance of a dispatched agent. If an agent performs well, sensor 36 reinforces critic network 37, which in turn reinforces the corresponding action network 38 such that it is more likely that the same agent/program module is selected under similar circumstances. On the other hand, if an agent performs poorly, sensor 36 negatively reinforces critic network 37, which in turn reduces its utility output to action networks 38 to reduce the likelihood that the same agent/program modules is selected under similar circumstances.

In the alternative, other reinforcement learning modules and algorithms may be used. For example, other neural network architectures, such as Q-Learning neural networks, Bayesian networks, dynamic programming techniques, among others, may be used.

Module 34 may be initially trained in a manner known in the art, e.g., by using example training records. In the alternative, module 34 may simply be initialized with predetermined or random networks which act as a starting reference point from which the module adaptively learns. The former approach often improves the quality of the initial decisions made by the module in operation.

Agent pool 42 includes a plurality of agents in which the domain knowledge thereof varies in the degree of autonomy delegated thereto during negotiations, the internal knowledge therein, and the inputs to which an agent is responsive thereto. At one extreme, a simple intermediary agent, or fully dependent agent, may have little domain knowledge in that the agent merely serves the function of passing messages between a client and another party to a negotiation, such that authority for determining offers, accepting or rejecting offers, implementing negotiation strategies, etc. rests fully with the client. At the other extreme, a fully autonomous agent may be provided with the basic parameters for a desired transaction and thereafter entrusted with the authority to complete such a transaction free from any additional input on the part of the client. Between these extremes, one or more additional agents, referred to as semi-autonomous agents, may be entrusted with the ability to conduct limited negotiations. One possible semi-autonomous agent may be authorized to conduct negotiations for a limited number of offer iterations, but with final authority for approving an agreed-upon transaction still resting with the client. Other possible degrees of domain knowledge between the extremes are also possible.

Figure 8:
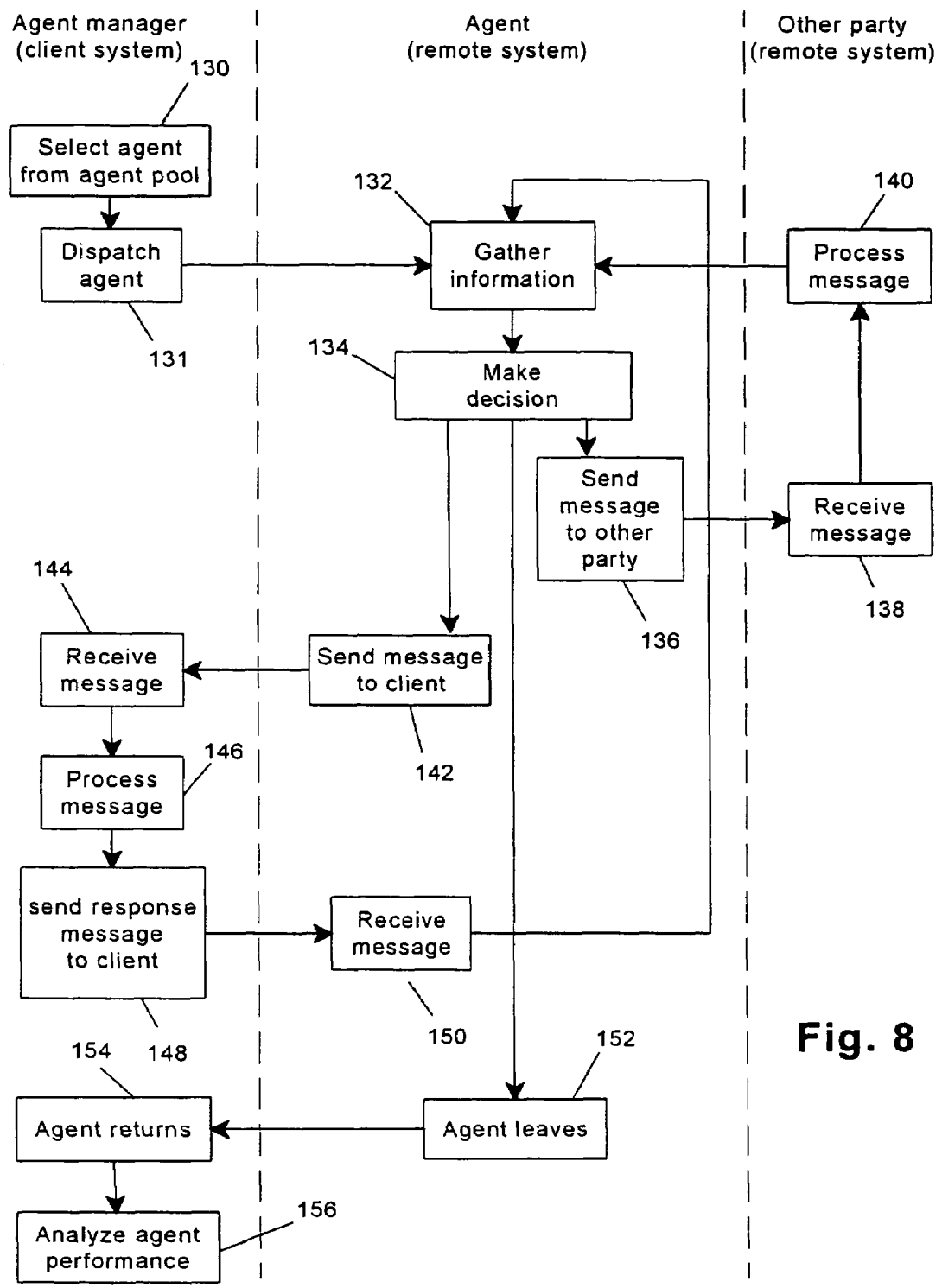
FIG. 8 is a flowchart illustrating the operation of a semi-autonomous agent consistent with invention.

FIG. 8 illustrates an exemplary program flow for negotiation with a semi-autonomous agent which has authority to negotiate with another party with limits on the offer amount and the number of iterations (offers made by the agent) that the agent can undertake on its own. The interaction between the agent and an agent manager on a client system, and the other party being negotiated with (another agent, computer process or system, or individual interacting through a computer), is also illustrated.

For the semi-autonomous agent, negotiations are instituted after the agent manager selects the agent from the agent pool and dispatches the agent, as illustrated in blocks 130 and 131. It should be appreciated that the agent may be dispatched with a desired transaction or transactions which the client wishes to complete (including information such as desired quantity, description of goods/services to be sold/purchased, etc.), as well as any other constraints placed upon the agent by the manager (e.g., the number of negotiation iterations to process, a maximum or minimum limit on the amount to offer, etc.). In the alternative, some or all of this information may be relayed to the agent at a later time by the agent manager.

Next, in block 132, the agent gathers information after it has been dispatched to the remote system. For example, the agent may poll a bulletin board or market for outstanding offers, or may attempt to find and initiate negotiations with another party, e.g., another computer system, another agent, or an individual interacting through a computer system. The agent may also simply wait for incoming offers from other parties. Block 132 also performs the functions of processing messages from other parties and from the agent manager.

Next, in response to input received by the agent, a decision is made in block 134. It is in this block that a negotiation strategy of the agent is implemented, whereby the agent determines, based upon the input it receives, whether and how to proceed in negotiations with another party.

Generally, one of three actions may be instituted in response to block 134. First, as illustrated by block 136, a message may be sent to the other party, e.g., indicating acceptance or rejection of an outstanding offer, issuing an offer or counteroffer, terminating negotiations, requesting that the other party wait, etc. The other party receives the message at block 138 and processes it at block 140, typically issuing a response message back to the agent. Control then returns to block 132 to process the response message from the other party.

Second, as illustrated by block 142, the agent may decide to send a message back to the agent manager. The agent manager then receives the message at block 144, processes the message in block 146 and sends a response message back to the agent in block 148. In block 150, the agent receives the message and passes control to block 132 to process the response message from the agent manager. Also, as disclosed in U.S. patent application Ser. No. 08/822,119, entitled "APPARATUS AND METHOD FOR COMMUNICATING BETWEEN AN INTELLIGENT AGENT AND CLIENT COMPUTER PROCESS USING DISGUISED MESSAGES" (which has been incorporated by reference), the messages between the agent and its manager may be disguised to impede scrutiny by third parties.

Third, as illustrated by block 152, the agent may decide to leave the remote system and return to its client system, e.g., after completion of a successful transaction or after termination of an unsuccessful negotiation. An agent may "leave" when its program code is moved or transmitted from the remote system to the client system. In the alternative, an agent may transmit any necessary information (e.g., domain knowledge and/or results) to the client system and terminate on the remote system.

The return of the agent is illustrated in block 154. Then, in block 156, the performance of the agent may be analyzed in the manner discussed above.

Figure 9:
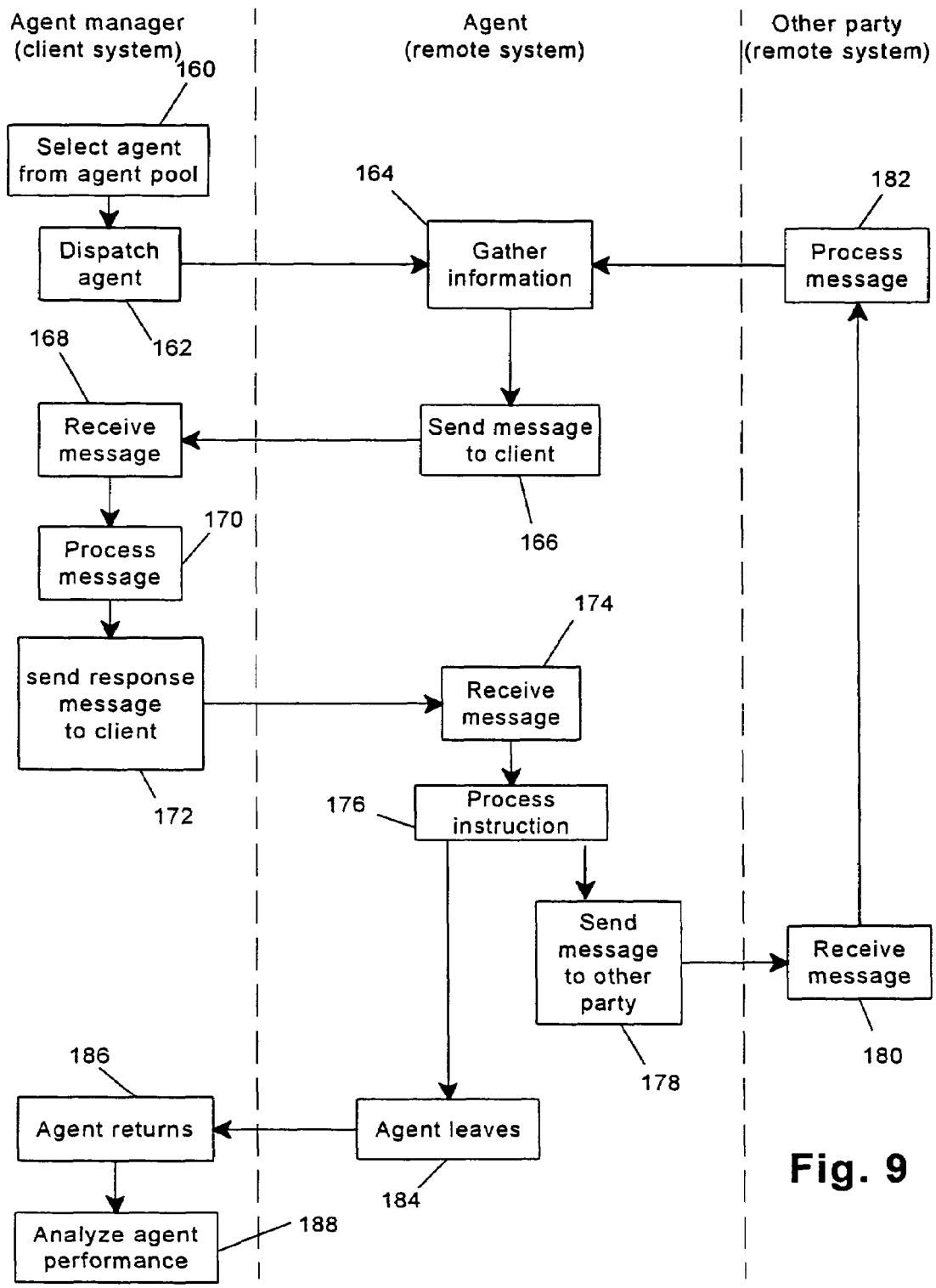
FIG. 9 is a flowchart illustrating the operation of a fully-dependent agent consistent with invention.

FIG. 9 illustrates an exemplary program flow for negotiation with a fully-dependent agent which acts principally as an intermediary with no authority to negotiate with another party without specific instructions from the agent manager. As with the semi-autonomous agent, negotiations are instituted after the agent manager selects the agent from the agent pool and dispatches the agent, as illustrated in blocks 160 and 162. Next, in block 164, the agent gathers information after it has been dispatched to the remote system. Block 164 also performs the functions of processing messages from other parties.

Next, in response to input received by the agent (typically as a result of an offer being received from another party), a message is sent to the agent manager in block 166. The agent manager then receives the message at block 168, processes the message in block 170 and sends a response message back to the agent in block 172. As with the semi-autonomous agent, messages between the agent and agent manager may be disguised to impede scrutiny by third parties.

Next, in block 174, the agent receives the message and passes control to block 176 to process the instruction provided in the response message. Generally, one of two actions may be instituted in response to block 176. First, as illustrated by block 178, a message may be sent to the other party, e.g., indicating acceptance or rejection of an outstanding offer, issuing an offer or counteroffer, terminating negotiations, requesting that the other party wait, etc. The other party receives the message at block 180 and processes it at block 182, typically issuing a response message back to the agent. Control then returns to block 164 to process the response message from the other party.

Second, as illustrated by block 184, the agent may decide to leave the remote system and return to its client system, e.g., after completion of a successful transaction or after termination of an unsuccessful negotiation. The return of the agent is illustrated in block 186. Then, in block 188, the performance of the agent may be analyzed in the manner discussed above.

Figure 10:
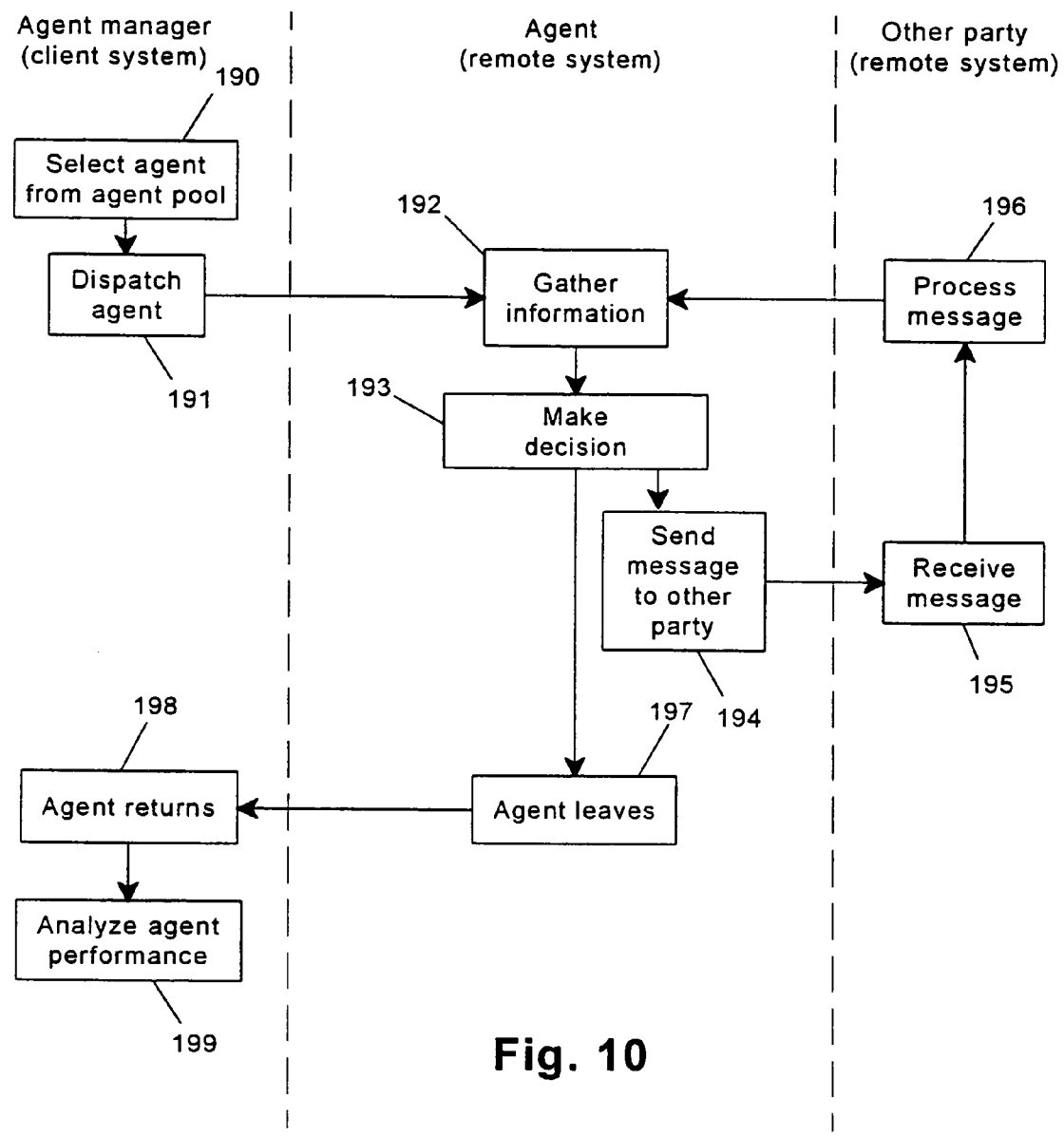
FIG. 10 is a flowchart illustrating the operation of a fully-autonomous agent consistent with invention.

FIG. 10 illustrates an exemplary program flow for negotiation with a fully-autonomous agent which has full authority to conduct negotiations with little or no supervision by the agent manager. As with the semi-autonomous agent, negotiations are instituted after the agent manager selects the agent from the agent pool and dispatches the agent, as illustrated in blocks 190 and 191. Next, in block 192, the agent gathers information after it has been dispatched to the remote system. Block 192 also performs the functions of processing messages from other parties.

Next, in response to input received by the agent (typically as a result of an offer being received from another party), control passes to block 193 to make a decision based upon the inputs to the agent. It is in this block that a negotiation strategy of the agent is implemented, whereby the agent determines, based upon the input it receives, whether and how to proceed in negotiations with another party.

Generally, one of two actions may be instituted in response to block 193. First, as illustrated by block 194, a message may be sent to the other party, e.g., indicating acceptance or rejection of an outstanding offer, issuing an offer or counteroffer, terminating negotiations, requesting that the other party wait, etc. The other party receives the message at block 195 and processes it at block 196, typically issuing a response message back to the agent. Control then returns to block 192 to process the response message from the other party.

Second, as illustrated by block 197, the agent may decide to leave the remote system and return to its client system, e.g., after completion of a successful transaction or after termination of an unsuccessful negotiation. The return of the agent is illustrated in block 198. Then, in block 199, the performance of the agent may be analyzed in the manner discussed above.

Any number of negotiation strategies and features may be incorporated into any of the agents in age 42. For example, U.S. patent application Ser. No. 08/821,935, entitled "INTELLIGENT AGENT WITH NEGOTIATION CAPABILITY AND METHOD OF NEGOTIATION THEREWITH", which has been incorporated by reference, discloses a suitable negotiation strategy which relies on the previous and current offers from the agent as well as the previous and current prices offered by the other party. A number of additional negotiation features implemented in the aforementioned application may also be used, including dynamic value determination, disguising negotiation strategy by randomizing an agent's behavior, and limiting unproductive negotiations by constraining an agent's behavior, among others. Other negotiation strategies and features may also be used consistent with the invention.

Moreover, any of the agents in agent pool 42 may be implemented using neural networks for implementing decision making and/or message disguising, as disclosed in U.S. patent application Ser. No. 08/822,119, entitled "APPARATUS AND METHOD FOR COMMUNICATING BETWEEN AN INTELLIGENT AGENT AND CLIENT COMPUTER PROCESS USING DISGUISED MESSAGES" (which has been incorporated by reference). For example, for a semi-autonomous agent, a neural network may be configured to receive the following inputs:
    other party's last price
    other party's current price
    agent's last public offer
    product characteristics
    instruction from manager:
        increase in offer authorized
        increase in iterations authorized
        increase in offer not authorized
        increase in iterations not authorized
    last message sent back to manager In addition, the neural network may be configured to generate the following outputs:
    public price offer
    message to other party
        make offer
        withdraw offer
        accept
        reject
        counteroffer
        please wait
        finished
    message to manager
        probable acceptable alternative, do you accept
        iterations exceeded, recommend continue
        iterations exceeded, recommend withdrawal
        recommend immediate withdrawal
        dummy transmission to motivate negotiation
        request approval to increase offer For a fully-dependent agent, a neural network may be configured to receive the following inputs:
    other party's last price
    other party's current price
    number of iterations
    agent's last public offer
    product characteristics
    instruction from manager:
        buy or sell
        withdraw
        counteroffer In addition, the neural network may be configured to generate the following outputs:
    public price offer
    message to other party
        make offer
        withdraw offer
        accept
        reject
        counteroffer
        finished
    message to manager
        current price offer
        other party's current price
        feature presence For a fully-autonomous agent, a neural network may be configured to receive the following inputs:
    other party's last price
    other party's current price
    number of iterations
    agent's last public offer
    product characteristics In addition, the neural network may be configured to generate the following outputs:
    public price offer
    message to other party
        make offer
        withdraw offer
        accept
        reject
        counteroffer
        finished Moreover, for training purposes, additional information may also be used in the generation of suitable training records for any of the above agents, although such information is not directly input to the neural network. Such information may include:
    desired price and features
    agent autonomy price range (range of prices within which agent is authorized to negotiate autonomously)
    manager approval price range (range of prices within which agent requires approval from manager)
    acceptable iterations allowed without approval It should be appreciated that other agents implementing alternate negotiation strategies and decision making processes, and with other degrees of autonomy between fully-autonomous and fully-dependent, may be used in the alternative. Moreover, it should be appreciated that other functionality may be required for the autonomous operation of any of the agents in agent pool 42, and that such additional functionality may be implemented via procedural logic and/or neural networks. For example, functions such as initialization, maintenance, finding other agents or markets to interact with, etc. may also be utilized. However, as these functions relate more to the basic operation of an agent, which is in general known in the art, these functions will not be discussed in any greater detail herein.

Referring again to FIG. 7, as discussed above, agent manager 32 may select from multiple program modules of varied degrees of domain knowledge to perform a desired computer task. Agent manager 32 may utilize an agent from pool 42 having multiple program modules with varied degrees of domain knowledge, and then configure the agent to execute a selected program module based upon the objective criteria.

Figure 11:
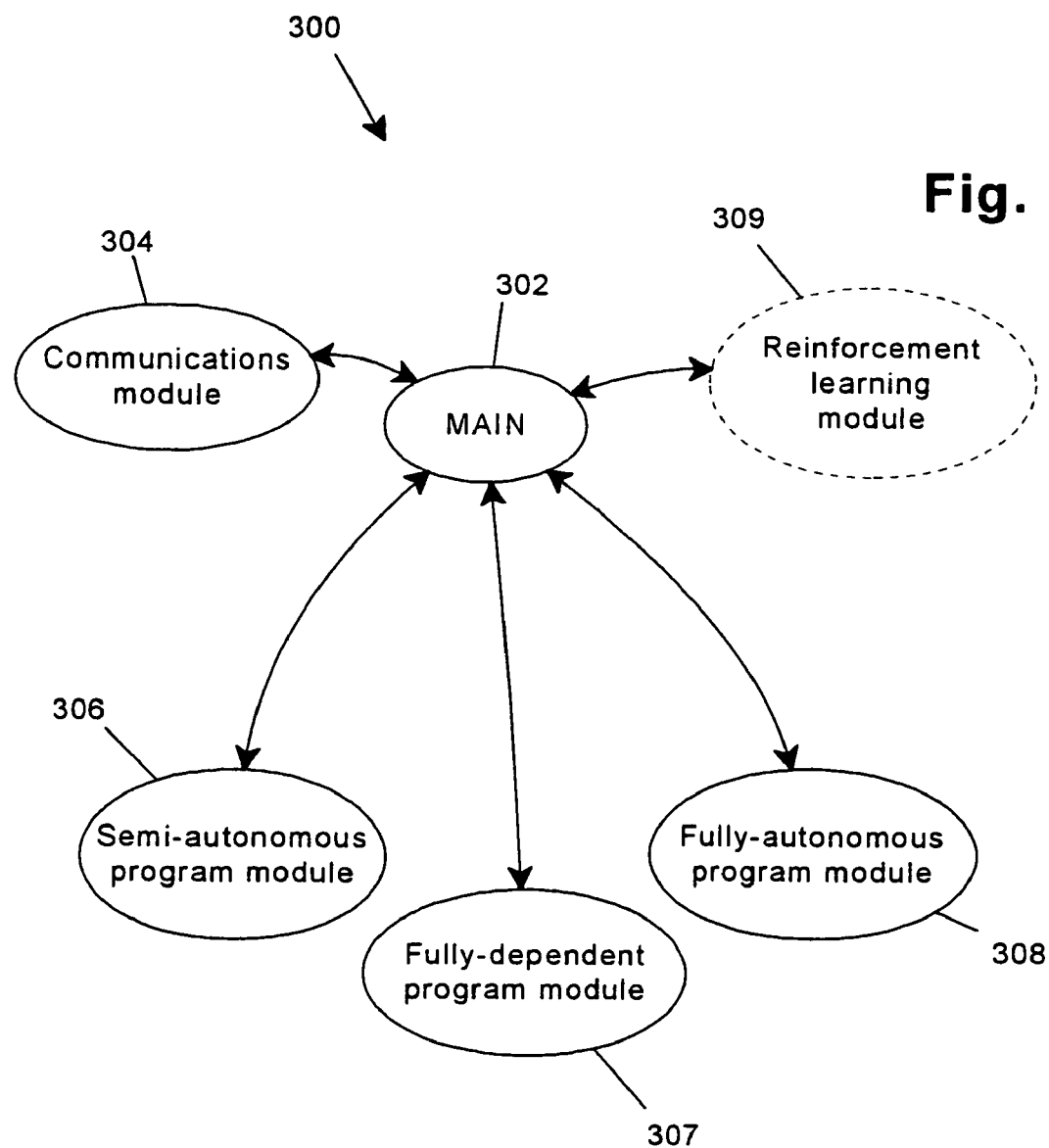
FIG. 11 is a block diagram of an exemplary intelligent agent having multiple program modules of varied degrees of domain knowledge.

For example, as shown in FIG. 11, agent manager 32 may utilize an agent 300 that includes a main module 302 which oversees the operations of the agent, and a communications module 304 that handles communications between the agent and its manager, and between the agent and other parties. Moreover, one or more additional program modules 306-308 are interconnected to main module 302 to provide alternate functionality for the agent. Program module 306 implements a semi-autonomous functionality which operates in the manner disclosed above for the semi-autonomous agent of FIG. 8. Program module 307 implements a fully-dependent functionality which operates in the manner disclosed above for the fully-dependent agent of FIG. 9. Program module 308 implements a fully-autonomous functionality which operates in the manner disclosed above for the fully-autonomous agent of FIG. 10.

Selection of which of modules 306-308 may be made by agent manager, in the manner disclosed above with reference to FIG. 7. In the alternative, selection of program modules based upon an objective criteria may be made internally within the agent, e.g., using predetermined selection criteria (e.g., to employ different negotiation strategies depending upon the time of day, etc.), or using an optional reinforcement learning module 309 which operates in a similar manner to module 34 discussed above. It should be appreciated that when selection is performed within an agent, selections may be updated from time to time to adapt the behavior of the agent in view of changing circumstances.

Figure 12:
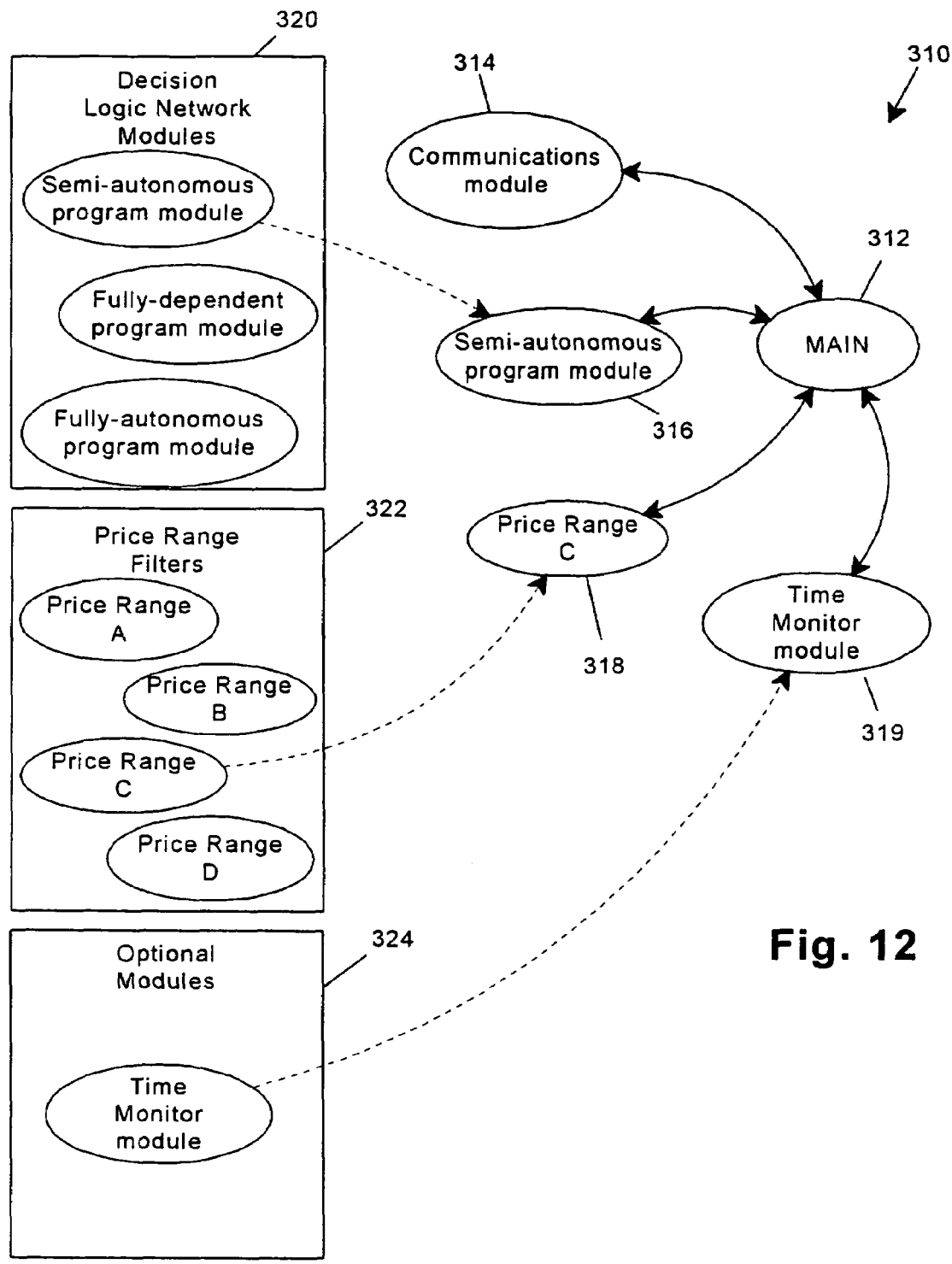
FIG. 12 is a block diagram of another exemplary intelligent agent constructed from program modules from one or more pools of program modules.

As also illustrated in FIG. 7, agent manager 32 may rely on one or more pools of program modules 42' to construct a task-specific agent depending upon an objective criteria. For example, as shown in FIG. 12, agent manager 32 may construct an agent 310 from a number of components. First, components which are generic to all permutations of an agent may be utilized, e.g., a main module 312 and communications module 314.

Second, components may be selected from pluralities of alternate program modules. For example, in one embodiment where the decision logic of an agent is implemented in a neural network, a pool 320 of decision logic neural network modules may be provided, with another pool 322 of price range filters used to optimize the operation of the neural network modules for different price ranges. The use of the latter pool 322 permits the modules in pool 320 to be price independent so that, when agent manager 32 is required to dispatch an agent to conduct transactions for a particular product in a particular price range, the agent manager merely selects an appropriate decision logic network module from pool 320 (e.g., semi-autonomous program module 316) and price range filter from pool 322 (e.g., price range C filter 318). Other manners of customizing the modules in pool 320 may be envisioned, e.g., selecting from different requirements filters to optimize an agent for different products. Also, both procedural and neural network implemented decision logic modules may be included in pool 320 so that, depending upon the risk to a dispatched agent, either type of logic may be utilized.

Third, instead of selecting among alternate program modules, agent manager 32 may add additive program modules to enhance the domain knowledge of the dispatched agent. For example, in one embodiment, a pool of optional modules 324 may be provided with, among other modules, a time monitor module 319 that permits the negotiation strategy of the agent to vary depending upon the time of day (e.g., for markets which tend to be more volatile at the end of the day, module 319 may implement a more conservative negotiation strategy than otherwise employed). Other optional functionality may be implemented. For example, agent performance monitoring may optionally be included within agent 310 if desired.

Any number of programming languages and underlying platforms may be utilized to implement agents consistent with the invention. For example, Java and other object oriented programming languages are particularly well suited for use with agents implementing multiple program modules having varied degrees of domain knowledge, as separate classes implementing each of the alternate program modules may be interconnected with one another in a single package.

Other modifications may be made to the illustrated embodiments without departing from the spirit and scope of the invention. Therefore, the invention lies solely in the claims hereinafter appended.

What is claimed is:

1. A program product comprising:
   (a) a program configured to perform a computer task using an intelligent agent, the program comprising an intelligent agent including at least one of a plurality of program modules having varied degrees of autonomy, wherein the plurality of program modules are each configured to handle a common computer task that includes conducting negotiations in an electronic commerce application, and wherein, based upon an objective criteria, at least one selected program module from the plurality of program modules is selected to handle the computer task; and
   (b) a signal bearing media bearing the program.

2. The program product of claim 1, wherein the signal bearing media is transmission type media.

3. The program product of claim 1, wherein the signal bearing media is recordable media.

4. The program product of claim 1, wherein the program further includes an evaluation module configured to select the selected program module based upon the objective criteria.

5. The program product of claim 4, wherein the program further includes a reinforcement learning module, coupled to the evaluation module and configured to adaptively select program modules based upon the performance of the plurality of program modules in handling the computer task.

6. The program product of claim 5, wherein the reinforcement learning module comprises an adaptive heuristic critic neural network.

7. The program product of claim 4, wherein the evaluation module is configured to retrieve information for a selected computer task, determine a selected value for the objective criteria for the selected computer task, and select as the selected program module one of the plurality of program modules which is matched with the selected value of the objective criteria.

8. The program product of claim 4, wherein the evaluation module is implemented in an agent manager.

9. The program product of claim 4, wherein the evaluation module is implemented in the intelligent agent.

10. The program product of claim 4, wherein the intelligent agent includes only the selected program module from the plurality of program modules, and wherein the evaluation module is configured to construct the intelligent agent using the selected program module.

11. The program product of claim 4, wherein the intelligent agent includes each of the plurality of program modules, and wherein the evaluation module is configured to execute only the selected program module to handle the computer task.

12. The program product of claim 4, wherein the plurality of program modules are additive program modules, and wherein the evaluation module is configured to select a subset of the plurality of program modules to handle the computer task.

13. The program product of claim 4, wherein the plurality of program modules are alternative program modules, and wherein the evaluation module is configured to select only one of the plurality of program modules to handle the computer task.

14. The program product of claim 1, wherein the plurality of program modules includes a semi-autonomous program module, a fully-autonomous program module, and a fully-dependent program module.

15. The program product of claim 1, wherein the objective criteria includes a risk that a dispatched agent is subjected to in negotiations.

16. A method of handling a computer task using an intelligent agent, the method comprising the steps of:
   (a) based upon an objective criteria, selecting at least one selected program module from a plurality of program modules having varied degrees of autonomy, wherein the plurality of program modules are each configured to handle a common computer task that includes conducting negotiations in an electronic commerce application; and
   (b) configuring an intelligent agent to execute the at least one selected program module to handle the computer task.

17. The method of claim 16, wherein the intelligent agent includes only the selected program module from the plurality of program modules, and wherein the configuring step includes the step of constructing the intelligent agent using the selected program module.

18. The method of claim 16, wherein the intelligent agent includes each of the plurality of program modules, and wherein the configuring step includes the step of configuring the intelligent agent to execute only the selected program module to handle the computer task.

19. The method of claim 16, wherein the selecting step is performed by the intelligent agent.

20. The method of claim 16, wherein the selecting step is performed by an agent manager.

21. The method of claim 16, wherein the plurality of program modules are additive program modules, and wherein the selecting step includes the step of selecting a subset of the plurality of program modules to handle the computer task.

22. The method of claim 16, wherein the plurality of program modules are alternative program modules, and wherein the selecting step includes the step of selecting only one of the plurality of program modules to handle the computer task.

23. The method of claim 16, wherein the selecting step includes the step of adaptively selecting the selected program module using a reinforcement learning algorithm.

24. The method of claim 23, further comprising the steps of:
   (a) obtaining performance information relating to the performance of the selected program module in handling the computer task; and
   (b) supplying the performance information to the reinforcement learning algorithm.

25. The method of claim 23, wherein the reinforcement learning algorithm is implemented in an adaptive heuristic critic neural network.

26. The method of claim 16, wherein the selecting step includes the steps of:
   (a) matching each of the plurality of program modules with a value of the objective criteria;
   (b) determining a selected value of the objective criteria; and
   (c) selecting as the selected program module a program module matching the selected value of the objective criteria.

27. The method of claim 26, wherein the selecting step further includes the step of retrieving information for a selected computer task, wherein the determining step determines the selected value of the objective criteria using the retrieved information.

28. The method of claim 16, wherein the plurality of program modules includes a semi-autonomous program module, a fully-autonomous program module, and a fully-dependent program module.

29. The method of claim 16, wherein the objective criteria includes a risk that a dispatched agent is subjected to in negotiations.

30. An apparatus for handling a computer task, comprising:
   a memory; and
   an intelligent agent resident in the memory, the intelligent agent including at least one of a plurality of program modules having varied degrees of autonomy, wherein the plurality of program modules are each configured to handle a common computer task that includes conducting negotiations in an electronic commerce application, and wherein, based upon an objective criteria, at least one selected program module from the plurality of program modules is selected to handle the computer task.

31. The apparatus of claim 30, further comprising an evaluation module configured to select the selected program module based upon the objective criteria.

32. The apparatus of claim 31, further comprising a reinforcement learning module, coupled to the evaluation module and configured to adaptively select program modules based upon the performance of the plurality of program modules in handling the computer task.

33. The apparatus of claim 32, wherein the reinforcement learning module comprises an adaptive heuristic critic neural network.

34. The apparatus of claim 31, wherein the evaluation module is configured to retrieve information for a selected computer task, determine a selected value for the objective criteria for the selected computer task, and select as the selected program module one of the plurality of program modules which is matched with the selected value of the objective criteria.

35. The apparatus of claim 31, wherein the evaluation module is implemented in an agent manager.

36. The apparatus of claim 31, wherein the evaluation module is implemented in the intelligent agent.

37. The apparatus of claim 31, wherein the intelligent agent includes only the selected program module from the plurality of program modules, and wherein the evaluation module is configured to construct the intelligent agent using the selected program module.

38. The apparatus of claim 31, wherein the intelligent agent includes each of the plurality of program modules, and wherein the evaluation module is configured to execute only the selected program module to handle the computer task.

39. The apparatus of claim 31, wherein the plurality of program modules are additive program modules, and wherein the evaluation module is configured to select a subset of the plurality of program modules to handle the computer task.

40. The apparatus of claim 31, wherein the plurality of program modules are alternative program modules, and wherein the evaluation module is configured to select only one of the plurality of program modules to handle the computer task.

41. The apparatus of claim 30, wherein the plurality of program modules includes a semi-autonomous program module, a fully-autonomous program module, and a fully-dependent program module.

42. The apparatus of claim 30, wherein the objective criteria includes a risk that a dispatched agent is subjected to in negotiations.

43. A method of handling a computer task on a remote computer system using an intelligent agent, the method comprising the steps of:
 (a) determining a risk for the remote computer system;
 (b) based upon the risk for the remote computer system, selecting at least one selected program module from a plurality of program modules having varied degrees of domain knowledge, wherein the plurality of program modules are configured to handle a common computer task in the remote computer system; and
 (c) configuring an intelligent agent to execute the at least one selected program module to handle the computer task.

44. The method of claim 43, further comprising the step of matching each of the plurality of program modules with a risk level.

45. The method of claim 44, wherein the matching step includes the step of adaptively matching each program module based upon the actual performance of the plurality of program modules.

\* \* \* \* \*